US012333754B2

(12) United States Patent
Firintepe

(10) Patent No.: US 12,333,754 B2
(45) Date of Patent: Jun. 17, 2025

(54) SYSTEM AND METHOD FOR CAPTURING A SPATIAL ORIENTATION OF A WEARABLE DEVICE

(71) Applicant: Bayerische Motoren Werke Aktiengesellschaft, Munich (DE)

(72) Inventor: Ahmet Firintepe, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 495 days.

(21) Appl. No.: 17/449,268

(22) Filed: Sep. 29, 2021

(65) Prior Publication Data
US 2022/0114748 A1   Apr. 14, 2022

(30) Foreign Application Priority Data
Oct. 14, 2020   (DE) ...................... 10 2020 126 954.4

(51) Int. Cl.
| G06T 7/70 | (2017.01) |
| G02B 27/01 | (2006.01) |
| G06F 18/21 | (2023.01) |
| G06N 3/08 | (2023.01) |
| G06T 7/50 | (2017.01) |
(Continued)

(52) U.S. Cl.
CPC ............ G06T 7/70 (2017.01); G02B 27/0172 (2013.01); G06F 18/21 (2023.01); G06N 3/08 (2013.01); G06T 7/50 (2017.01); G06V 20/41 (2022.01); G06V 20/59 (2022.01); *G02B 2027/0138* (2013.01); *G02B 2027/014* (2013.01); *G02B 2027/0178* (2013.01); *G06T 2207/10016* (2013.01); *G06T 2207/20081* (2013.01); *G06T 2207/30268* (2013.01)

(58) Field of Classification Search
CPC ......... G06T 19/006; G06T 2207/10016; G06T 7/50; G06T 7/70; G06T 2207/30268; G06V 20/59; G06V 20/20; G06F 3/011; G06F 3/013; G06F 3/012
See application file for complete search history.

(56) References Cited

U.S. PATENT DOCUMENTS

| 2015/0378156 A1* | 12/2015 | Kuehne ................ G02B 27/017 345/8 |
| 2016/0041624 A1 | 2/2016 | Spiessl et al. |
| 2019/0108651 A1 | 4/2019 | Gu et al. |
(Continued)

FOREIGN PATENT DOCUMENTS

| DE | 10 2013 207 528 A1 | 10/2014 |
| DE | 10 2016 225 082 A1 | 6/2018 |
(Continued)

OTHER PUBLICATIONS

German-language Office Action issued in German Application No. 10 2020 126 954.4 dated Jul. 21, 2021 with partial English translation (seven (7) pages).

*Primary Examiner* — Margaret G Webb
(74) *Attorney, Agent, or Firm* — Crowell & Moring LLP

(57) ABSTRACT

A system for capturing a spatial orientation of a wearable device includes at least one capturing unit that is configured to capture image data in relation to the wearable device; and at least one processor unit that is configured to determine the spatial orientation of the wearable device based on the image data, using a recognition algorithm trained by way of deep learning.

19 Claims, 2 Drawing Sheets

(51) Int. Cl.
*G06V 20/40* (2022.01)
*G06V 20/59* (2022.01)

(56) References Cited

U.S. PATENT DOCUMENTS

| | | | | |
|---|---|---|---|---|
| 2019/0303723 | A1* | 10/2019 | Linden | G06T 7/70 |
| 2020/0064912 | A1* | 2/2020 | Melatti | G06F 3/013 |
| 2020/0207358 | A1* | 7/2020 | Katz | G02B 27/0093 |
| 2020/0293064 | A1 | 9/2020 | Wu et al. | |
| 2020/0320788 | A1* | 10/2020 | Kühne | G06F 3/04815 |
| 2021/0081754 | A1* | 3/2021 | Frolova | G06N 3/04 |
| 2021/0365707 | A1* | 11/2021 | Mao | H04N 23/683 |
| 2022/0011104 | A1* | 1/2022 | Kahle | G06F 3/011 |
| 2022/0083134 | A1* | 3/2022 | Kassner | G06F 3/013 |

FOREIGN PATENT DOCUMENTS

| | | |
|---|---|---|
| DE | 10 2018 124 211 A1 | 4/2019 |
| DE | 10 2020 100 685 A1 | 9/2020 |

\* cited by examiner

SYSTEM AND METHOD FOR CAPTURING A SPATIAL ORIENTATION OF A WEARABLE DEVICE

CROSS REFERENCE TO RELATED APPLICATION

This application claims priority under 35 U.S.C. § 119 from German Patent Application No. 10 2020 126 954.4, filed Oct. 14, 2020, the entire disclosure of which is herein expressly incorporated by reference.

BACKGROUND AND SUMMARY OF THE INVENTION

The present disclosure relates to a system for capturing a spatial orientation of a wearable device, to a vehicle having such a system, to an assistance system having such a system, to a method for capturing a spatial orientation of a wearable device and to a storage medium for executing the method. The present disclosure relates in particular to the tracking of smart glasses.

Smart glasses are wearable computers that are able to add information to the field of view of the user, for example in order to enable augmented reality. Such smart glasses may also be used in vehicles in order to offer a user a seamless and believable illusion by way of virtual elements incorporated into the surroundings. In order to allow the virtual elements to be displayed correctly, it is necessary to determine a pose of the smart glasses. This may be performed for example by way of a camera that records the smart glasses. Such conventional tracking systems however do not achieve the accuracy desired for augmented reality, in particular due to the typically limited number of object features.

One object of the present disclosure is to specify a system for capturing a spatial orientation of a wearable device, a vehicle having such a system, an assistance system having such a system, a method for capturing a spatial orientation of a wearable device and a storage medium for executing the method, all of which allow improved tracking of a spatial orientation of the wearable device. One object of the present disclosure is in particular to improve the provision of augmented reality (AR) content for wearable devices.

This object is achieved by the claimed invention.

According to one independent aspect of the present disclosure, what is specified is a system for capturing a spatial orientation of a wearable device, in particular of smart glasses. The system comprises at least one capturing unit that is designed to capture image data in relation to the wearable device; and at least one processor unit that is designed to determine a spatial orientation of the wearable device based on the image data, using a recognition algorithm trained by way of deep learning.

According to an embodiment of the invention, a recognition algorithm is trained by way of deep learning to ascertain the spatial orientation of the wearable device. This allows improved provision of augmented reality (AR) content. Deep learning in this case denotes a machine learning method that uses artificial neural networks with intermediate layers or hidden layers between the input layer and output layer and thereby expands an internal structure.

The term "augmented reality" as used in the context of the present disclosure refers to a computer-aided expansion of the perception of reality for a user. The term "augmented reality" in particular refers to a visual display of information, such as for example computer-generated additional information or virtual objects, through inlaying or superimposition.

The wearable device is preferably smart glasses. Smart glasses are wearable devices that add information to the field of view of the user or wearer, for example in the context of augmented reality. The present disclosure is not however restricted thereto, and the wearable device may be a different object whose spatial orientation is to be determined.

The terms "orientation" and "spatial orientation", as used in the context of the present disclosure, refer to an arrangement or pose of the wearable device in three-dimensional space. The spatial orientation may be suitably derived from the image data.

The orientation may comprise one-dimensional, two-dimensional or three-dimensional information in relation to the wearable device and optionally a body part on which the wearable device is arranged. The orientation may in this case be absolute or relative. The body part on which the wearable device is arranged is preferably a head of a user, and in particular a face of the user or wearer of the wearable device. The user may be for example a driver of a vehicle.

The image data preferably specify at least one individual image or comprise or define at least one individual image. The at least one processor unit may be designed to extract the spatial orientation of the wearable device from the at least one individual image. The wearable device may in particular be located in terms of position and orientation by way of the recognition algorithm at runtime on the basis of individual images that are recorded for example by cameras in a vehicle passenger compartment.

The term "individual image" in this case means that the recognition algorithm extracts information in relation to the spatial orientation of the wearable device from the individual images. In other words, the spatial orientation of the wearable device in these exemplary embodiments of the present disclosure is extracted not based on a (temporal) correlation between a sequence of a plurality of images, but rather is extracted based on independent individual images or not taking into account a (temporal) correlation between individual images.

The recognition algorithm trained by way of deep learning is able to precisely determine the pose (position and orientation) of the wearable device from the individual images. By way of example, the system or the recognition algorithm may be trained using a deep learning method by collecting images of the wearable device, in which the wearable device appears in different positions and orientations, and by recording this position and orientation as a ground truth. Training using different wearable devices in the training data in this case makes it possible to track different wearable devices and thus enables scalability. As a result, it is possible to recognize and locate different types of object, such as for example various smart glasses.

The image data are preferably video data. The term "video data" in this case refers to the recording and processing of moving images.

The at least one processor unit is preferably designed to extract the spatial orientation of the wearable device from the video data. By way of example, the spatial orientation of the wearable device in this embodiment (and in contrast to the embodiment described above) may be determined based on a temporal correlation between a sequence of successive individual images in the video data.

The recognition algorithm trained by way of deep learning is able to precisely determine the pose (position and orientation) of the wearable device from the video data and the additional information contained therein in relation to the temporal relationship. By way of example, the system or the recognition algorithm may be trained using a deep learning method by recording videos of the wearable device, in which the wearable device appears in different positions and orientations, and by recording this position and orientation as a ground truth. Training using different wearable devices in the training data in this case makes it possible to track different wearable devices and thus enables scalability. As a result, it is possible to recognize and locate different types of object, such as for example various smart glasses.

The at least one processor unit is preferably furthermore designed to determine depth information or a shape of the wearable device based on the image data and using the recognition algorithm trained by way of deep learning.

The recognition algorithm trained by way of deep learning may in particular determine the three-dimensional (3D) shape of the wearable device, as a result of which location of the wearable device is able to be further improved. Training using different wearable devices in the training data in this case makes it possible to determine a 3D shape of different wearable devices and thus enables scalability. As a result, it is possible to recognize and locate different types of object, such as for example various smart glasses.

The at least one capturing unit preferably comprises at least one depth sensor that is designed to capture depth information in relation to the wearable device.

The recognition algorithm trained by way of deep learning is able to precisely determine the pose of the wearable device using the recorded depth information (one or more depth maps and/or one or more points clouds). By way of example, the system or the recognition algorithm may be trained using a deep learning method by collecting depth information of the wearable device, in which the wearable device appears in different positions and orientations, and by recording this position and orientation as a ground truth. Training using different wearable devices in the training data in this case makes it possible to track different wearable devices and thus enables scalability. As a result, it is possible to recognize and locate different types of object, such as for example various smart glasses.

The system preferably comprises a learning unit that is designed to perform (further) deep learning based on the captured image data.

The system is thus able to determine a pose from individual images significantly more precisely using deep learning. The images of the wearable device that appears in different positions and orientations may in this case be used as training data. A ground truth of the position and orientation may be recorded at the same time as these data. The system may be trained using a deep learning method with the aid of these labeled data.

In some embodiments, training is performed by way of deep learning before the system is used in a vehicle, that is to say before use in real operation. In further embodiments, the system may be further trained during use in real operation in order to continually improve the determination of the pose of the wearable device.

In some embodiments, training with various wearable devices may additionally make it possible to track different types of wearable devices. This leads to a high degree of scalability. In contrast to conventional approaches, training is possible in such a manner that different wearable devices are able to be recognized and located as soon as they are visible in a camera image, for example.

The system is preferably designed to provide an augmented reality (AR) function for the wearable device based on the determined spatial orientation of the wearable device.

The system is preferably designed to capture the spatial orientation of the wearable device in relation to a passenger compartment of a vehicle. By way of example, a driver of the vehicle, wearing smart glasses, is thus able to be provided with augmented reality content adapted to a movement of the vehicle and a movement of the head of the driver or of the smart glasses.

The at least one capturing unit preferably comprises a camera, in particular a passenger compartment camera. The camera is able to capture the wearable device, such that the precise pose of the wearable device is able to be determined based on features of the wearable device. In some embodiments, the camera may be an infrared camera, this being advantageous due to a controlled, largely interference-free and consistent exposure of the image data.

The at least one processor unit is a programmable arithmetic unit, that is to say a machine or an electronic circuit, that controls other elements in accordance with transmitted commands and in the process drives an algorithm (process).

According to a further independent aspect of the present disclosure, what is specified is a vehicle, in particular a motor vehicle. The vehicle comprises the system for capturing a spatial orientation of a wearable device, in particular of smart glasses, according to the embodiments of the present disclosure.

The term vehicle comprises automobiles, trucks, buses, RVs, motorcycles, etc. used to transport people, goods, etc. The term in particular comprises passenger transport motor vehicles.

According to a further independent aspect of the present disclosure, what is specified is an assistance system, in particular for a vehicle. The assistance system comprises the system for capturing a spatial orientation of a wearable device according to the embodiments of the present disclosure and the wearable device, such as for example smart glasses.

The wearable device is preferably glasses, and in particular augmented reality (AR) glasses or smart glasses.

According to a further independent aspect of the present disclosure, what is specified is a method for capturing a spatial orientation of a wearable device, in particular of smart glasses. The method comprises capturing image data in relation to the wearable device; and determining a spatial orientation of the wearable device based on the image data and using a recognition algorithm trained by way of deep learning.

The method may implement the aspects of the system described in this document for capturing a spatial orientation of a wearable device, in particular of smart glasses.

According to a further independent aspect, what is specified is a software (SW) program. The SW program may be designed to be executed on one or more processors in order thereby to execute the method described in this document for capturing a spatial orientation of a wearable device, in particular of smart glasses.

According to a further independent aspect, what is specified is a storage medium. The storage medium may comprise an SW program that is designed to be executed on one or more processors in order thereby to execute the method described in this document for capturing a spatial orientation of a wearable device, in particular of smart glasses.

According to a further independent aspect of the present disclosure, software containing program code for performing the method for capturing a spatial orientation of a wearable device, in particular of smart glasses, is to be executed when the software runs on one or more software-controlled apparatuses.

Other objects, advantages and novel features of the present invention will become apparent from the following detailed description of one or more preferred embodiments when considered in conjunction with the accompanying drawings.

Exemplary embodiments of the disclosure are illustrated in the figures and are described in more detail below.

DETAILED DESCRIPTION OF THE DRAWINGS

Unless indicated otherwise, the same reference signs are used for identical and functionally identical elements below.

Figure 1:
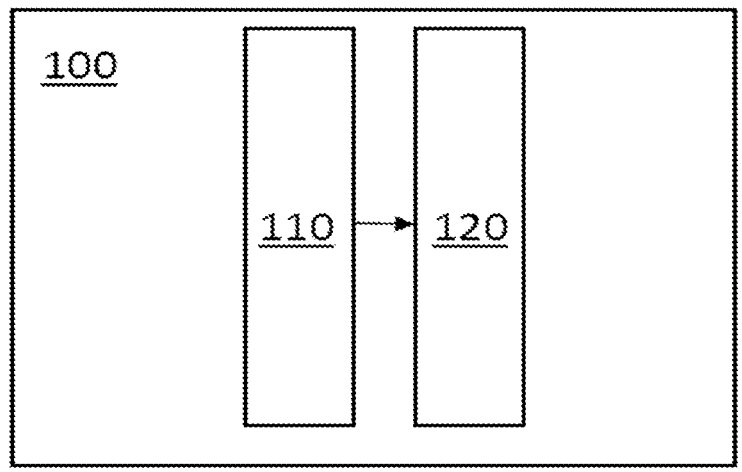
FIG. 1 schematically shows a system for capturing a spatial orientation of a wearable device according to embodiments of the present disclosure.
Figure 2:
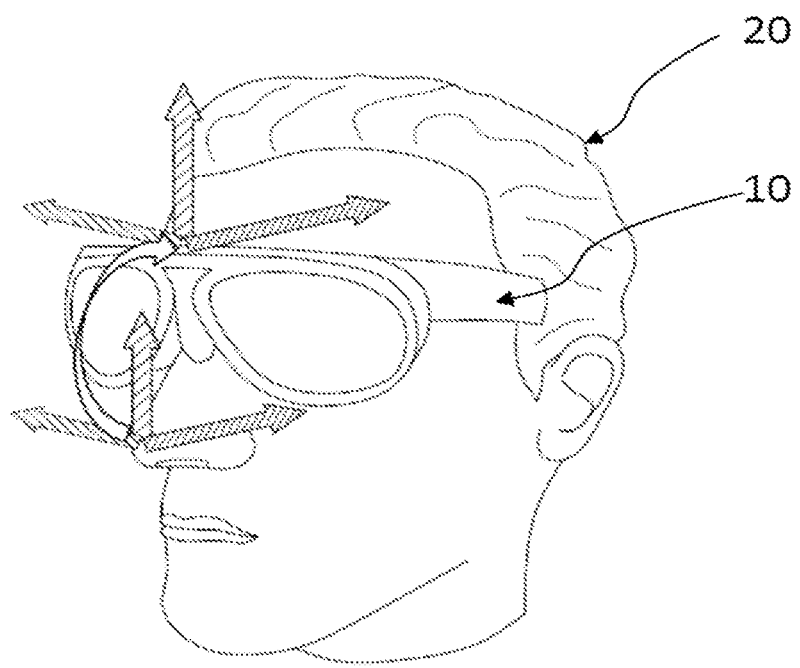
FIG. 2 schematically shows smart glasses worn by a user according to embodiments of the present disclosure.

FIG. 1 schematically shows a system 100 for capturing a spatial orientation of a wearable device 10 according to embodiments of the present disclosure. FIG. 2 schematically shows smart glasses worn by a user on his head 20 according to embodiments of the present disclosure.

The system 100 comprises at least one capturing unit 110 and at least one processor unit 120. The at least one capturing unit 110, which may for example be a camera, is designed to capture image data in relation to the wearable device 10. The at least one processor unit 120 is designed to determine a spatial orientation of the wearable device 10 based on the image data using a recognition algorithm trained by way of deep learning.

The system 100 according to an embodiment of the invention may be used for example to determine the pose (or position and orientation) of augmented reality glasses in the vehicle passenger compartment using learning-based methods. As a result, a user is able to be offered a seamless and believable illusion in the smart glasses by way of the virtual elements incorporated into the (real) surroundings. It is in particular possible to precisely locate smart glasses using deep learning. This allows an accurate display of virtual objects in the smart glasses.

Exemplary, equivalent and combinable embodiments that make it possible to locate the wearable device 10 are described below.

First Exemplary Embodiment

In the first exemplary embodiment, the image data that are captured by the at least one capturing unit 110 specify at least one individual image or comprise or define at least one individual image. The wearable device 10 may in particular be located in terms of position and orientation by way of the recognition algorithm at runtime on the basis of individual images that are recorded for example by cameras in a vehicle passenger compartment.

By way of example, cameras may record images of the wearable device. Cameras in the infrared spectrum are particularly advantageous for use in the vehicle due to the controlled, largely interference-free and consistent exposure of the image data. Based on a (large) amount of training data, the trained system 100 is automatically able to determine features, such as for example contrast gradients and/or edges in the images, which the system 100 may use at runtime for pose determination purposes. The pose or orientation of the wearable device 10 may be determined from these individual images and the features present therein. In some embodiments, the determined pose or orientation may be transferred to the wearable device 10 in order to realistically display virtual objects.

In some embodiments, which may be combined with other embodiments described herein, the system 100 may continually carry on learning and improve the pose determination. By way of example, the system 100 comprises a learning unit that is designed to perform (further) deep learning on the recognition algorithm based on the image data.

Second Exemplary Embodiment

In the second exemplary embodiment, the image data are video data. The at least one processor unit 120 may in this case be designed to extract the spatial orientation of the wearable device 10 from the video data. By way of example, the spatial orientation of the wearable device 10 in this embodiment (and in contrast to the first embodiment) may be determined based on a temporal correlation between a sequence of successive individual images in the video data.

By way of example, cameras may be used to continually record videos for pose determination purposes. Cameras in the infrared spectrum are particularly advantageous for use in the vehicle due to the controlled, largely interference-free and consistent exposure of the video data. Based on a (large) amount of training data, the trained system 100 is automatically able to determine features, such as for example contrast gradients and/or edges in the images, which the system 100 may use at runtime for pose determination purposes. The pose or orientation of the wearable device 10 may be determined from the videos and the temporal information contained therein. In some embodiments, the determined pose or orientation may be transferred to the wearable device 10 in order to realistically display virtual objects to the user.

In some embodiments, which may be combined with other embodiments described herein, the system 100 may continually carry on learning and improve the pose determination. By way of example, the system 100 comprises a learning unit that is designed to perform (further) deep learning on the recognition algorithm based on the video data.

Third Exemplary Embodiment

In the third exemplary embodiment, depth information of the wearable device 10 is determined based on the captured image data, so as to be able to achieve improved location of the wearable device.

By way of example, cameras may record images and/or videos of the wearable device 10. Cameras in the infrared spectrum are particularly advantageous for use in the vehicle due to the controlled, largely interference-free and consistent exposure of the image data.

In contrast to conventional stereoscopy, according to the third embodiment of the present disclosure, the depth information or shape of the wearable device (for example smart glasses) is learned from the image information by way of deep learning, and stereoscopic properties of the wearable device are ascertained implicitly. It is not necessary to use a dedicated and specific depth camera for this, meaning that production costs for the system according to an embodiment of the invention are able to be reduced. It is additionally possible to achieve greater depth accuracy, since the trained network automatically determines optimum pixel correspondences across the simultaneously recorded images. The depth information may be used to determine the pose of the wearable device, for example in order to realistically display virtual objects in smart glasses to a user.

The depth information also makes it possible for example to use smart glasses in the vehicle for remote interactions with other people by way of objects that are actually present (for example "holographic" video telephony) or with the vehicle on the basis of objects. One example is that of capturing and recognizing objects (for example shoes) to search for in online shops or local shops directly from the vehicle. The accurate determination of the depth information or shape of objects may thus be used to search for items in shops.

In some embodiments, which may be combined with other embodiments described herein, the system 100 may continually carry on learning and improve the depth determination. By way of example, the system 100 comprises a learning unit that is designed to perform (further) deep learning on the recognition algorithm based on the image data.

Fourth Exemplary Embodiment

In the fourth exemplary embodiment, the at least one capturing unit comprises at least one depth sensor that is designed to capture depth information in relation to the wearable device. In other words, the image data may (also) comprise depth information.

The depth information is used by the deep learning-based system according to an embodiment of the invention for pose determination purposes. The depth sensor in this case determines the depth information and the shape of the wearable device and optionally of the user (for example driver). From a large amount of training data, the trained system is able to automatically determine position differences for example between points of a points cloud and their orientation from the depth information that the system uses at runtime for pose determination purposes. In some embodiments, the determined pose or orientation may be transferred to the wearable device 10 in order to realistically display virtual objects to a user.

In some embodiments, which may be combined with other embodiments described herein, the system 100 may continually carry on learning and improve the pose determination. By way of example, the system 100 comprises a learning unit that is designed to perform (further) deep learning on the recognition algorithm based on the depth information.

Figure 3:
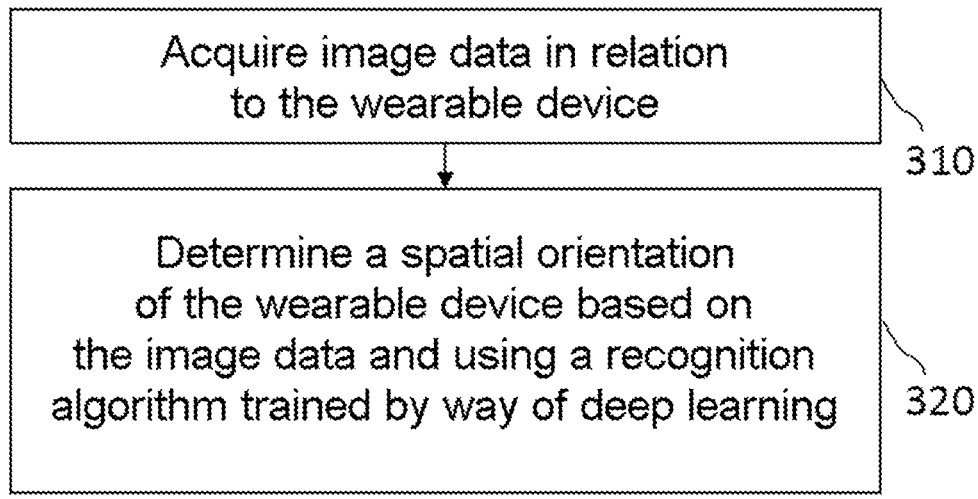
FIG. 3 shows a flowchart of a method for capturing a spatial orientation of a wearable device according to embodiments of the present disclosure.

FIG. 3 schematically shows a flowchart of a method 300 for capturing a spatial orientation of a wearable device according to embodiments of the present disclosure.

The method 300 may be implemented by appropriate software that is able to be executed by one or more processors (for example a CPU).

The method 300 comprises, in block 310, capturing image data in relation to the wearable device; and, in block 320, determining a spatial orientation of the wearable device based on the image data and using a recognition algorithm trained by way of deep learning.

According to an embodiment of the invention, a recognition algorithm is trained by way of deep learning to ascertain the spatial orientation of the wearable device. This allows improved provision of augmented reality (AR) content.

Although the invention has been explained and illustrated in more detail through preferred exemplary embodiments, the invention is not restricted to the disclosed examples and other variations may be derived therefrom by a person skilled in the art without departing from the scope of protection of the invention. It is therefore clear that there are a multiplicity of variation options. It is likewise clear that embodiments mentioned by way of example actually only constitute examples that should not be understood in any way as limiting for instance the scope of protection, the application options or the configuration of the invention. On the contrary, the above description and the description of the figures give a person skilled in the art the ability to implement the exemplary embodiments in specific terms, wherein a person skilled in the art with knowledge of the disclosed concept of the invention may make numerous modifications, for example with regard to the function or the arrangement of the individual elements mentioned in an exemplary embodiment, without departing from the scope of protection defined by the claims and their legal counterparts, such as for instance further explanations in the description.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for capturing a spatial orientation of a wearable device, the system comprising:
   at least one capturing unit that is configured to capture image data in relation to the wearable device; and
   at least one processor unit that is configured to determine the spatial orientation of the wearable device based on the image data, using a recognition algorithm trained by way of deep learning,
   wherein the recognition algorithm is trained by way of deep learning by collecting images of the wearable device in which the wearable device appears in different positions and orientations, and by recording each position and orientation of the wearable device as a ground truth.

2. The system according to claim 1, wherein the image data specify at least one individual image, and wherein the at least one processor unit is designed to extract the spatial orientation of the wearable device from the at least one individual image.

3. The system according to claim 1, wherein the image data are video data.

4. The system according to claim 3, wherein the at least one processor unit is configured to extract the spatial orientation of the wearable device from the video data.

5. The system according to claim 4, wherein the at least one processor unit is configured to determine the spatial orientation based on a temporal correlation between a sequence of successive individual images in the video data.

6. The system according to claim 1, wherein the at least one processor unit is further configured to determine depth information of the wearable device based on the image data and using the recognition algorithm trained by way of deep learning.

7. The system according to claim 1, wherein the at least one capturing unit comprises at least one depth sensor that is configured to capture depth information in relation to the wearable device.

8. The system according to claim 1, further comprising:
a learning unit for the recognition algorithm that is configured to perform deep learning.

9. The system according to claim 1, wherein the system is configured to capture the spatial orientation of the wearable device in relation to a passenger compartment of a vehicle.

10. The system according to claim 1, wherein the system is configured to provide an augmented reality function for the wearable device based on the determined spatial orientation of the wearable device.

11. The system according to claim 1, wherein the at least one capturing unit comprises a camera.

12. The system according to claim 11, wherein the camera is at least one or a passenger compartment camera or an infrared camera.

13. A vehicle comprising the system according to claim 1.

14. The vehicle according to claim 13, wherein the vehicle is a motor vehicle.

15. An assistance system comprising:
the system according to claim 1; and
the wearable device.

16. The assistance system according to claim 15, wherein the wearable device is glasses.

17. The assistance system according to claim 16, wherein the glasses are augmented reality glasses.

18. A method for capturing a spatial orientation of a wearable device, the method comprising:
capturing image data in relation to the wearable device; and
determining a spatial orientation of the wearable device based on the image data and using a recognition algorithm trained by way of deep learning,
wherein the recognition algorithm is trained by way of deep learning by collecting images of the wearable device in which the wearable device appears in different positions and orientations, and by recording each position and orientation of the wearable device as a ground truth.

19. A computer product comprising a non-transitory computer-readable medium having stored thereon program code which, when executed on one or more processors, carries out the acts of:
capturing image data in relation to the wearable device; and
determining a spatial orientation of the wearable device based on the image data and using a recognition algorithm trained by way of deep learning,
wherein the recognition algorithm is trained by way of deep learning by collecting images of the wearable device in which the wearable device appears in different positions and orientations, and by recording each position and orientation of the wearable device as a ground truth.

* * * * *